(12) United States Patent
Ito

(10) Patent No.: US 9,815,311 B2
(45) Date of Patent: Nov. 14, 2017

(54) INK JET RECORDING METHOD, INK JET RECORDING APPARATUS, AND METHOD FOR MANUFACTURING RECORDING MEDIUM

(71) Applicant: Seiko Epson Corporation, Tokyo (JP)

(72) Inventor: Wataru Ito, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/265,015

(22) Filed: Sep. 14, 2016

(65) Prior Publication Data

US 2017/0136796 A1    May 18, 2017

(30) Foreign Application Priority Data

Nov. 12, 2015   (JP) .................. 2015-221953

(51) Int. Cl.
| | |
|---|---|
| *B41M 5/00* | (2006.01) |
| *B41M 5/50* | (2006.01) |
| *C09D 11/36* | (2014.01) |
| *B41J 2/01* | (2006.01) |
| *C09D 11/107* | (2014.01) |
| *C09D 133/10* | (2006.01) |
| *C09D 11/106* | (2014.01) |
| *C09D 127/06* | (2006.01) |

(52) U.S. Cl.
CPC .............. *B41M 5/0064* (2013.01); *B41J 2/01* (2013.01); *B41M 5/0047* (2013.01); *C09D 11/106* (2013.01); *C09D 11/107* (2013.01); *C09D 11/36* (2013.01); *C09D 127/06* (2013.01); *C09D 133/10* (2013.01); *B41J 2202/03* (2013.01)

(58) Field of Classification Search
CPC ....................................................... B41M 5/50
See application file for complete search history.

(56) References Cited

U.S. PATENT DOCUMENTS

| | | | |
|---|---|---|---|
| 2002/0042475 A1* | 4/2002 | Patil ....................... | C08G 67/02 525/185 |
| 2015/0025183 A1* | 1/2015 | Park ........................ | C08L 67/04 524/186 |

FOREIGN PATENT DOCUMENTS

| | | |
|---|---|---|
| JP | 02-229070 A | 9/1990 |
| JP | 2011-025518 A | 2/2011 |

* cited by examiner

*Primary Examiner* — Shelby Fidler
(74) *Attorney, Agent, or Firm* — Harness, Dickey & Pierce, P.L.C.

(57) ABSTRACT

An ink jet recording method for carrying out recording on a recording medium which is formed of a vinyl chloride-based resin by discharging a solvent-based ink from an ink jet head, in which the recording medium satisfies
(1): an FT-IR peak wavenumber is less than 2924 cm$^{-1}$
(2): a contraction rate before and after leaving at 60° C. for 3 hours is less than 1.8%
(3): none of a phthalate ester-based plasticizer, a phosphate ester-based plasticizer, and a fatty acid ester-based plasticizer are included.

19 Claims, 2 Drawing Sheets

INK JET RECORDING METHOD, INK JET RECORDING APPARATUS, AND METHOD FOR MANUFACTURING RECORDING MEDIUM

BACKGROUND

1. Technical Field

The present invention relates to an ink jet recording method, an ink jet recording apparatus, and a method for manufacturing a recording medium.

2. Related Art

In the field of signs, an ink jet recording method is used in which recording is carried out on a recording medium formed of a vinyl chloride-based resin by discharging ink using an ink jet recording apparatus which uses a solvent-based ink. Since the recorded matter which is obtained by the recording method is displayed outside in many cases, it is necessary for the obtained recorded matter to have fastnesses which provide water resistance, scratch resistance, and light resistance, and moreover, it is necessary for the recording method to be able to carry out high density printing and to have dimensional stability at the time of drying after printing.

However, since the vinyl chloride-based resin which is the recording medium has poor ink absorbency and the ink is not easily fixed thereto, image quality defects may be caused by the ink aggregating, particularly in high density printing. Therefore, for example, JP-A-2-229070 discloses a printing method for improving the fixation, drying curability, scratch resistance, adhesiveness, and the like of ink by using a vinyl chloride-based resin which does not include a plasticizer which inhibits absorption of ink as a recording medium and moreover, employing a 3-layer structure in which an adhesive layer and an ink fixing layer are formed thereon. In addition, for example, JP-A-2011-25518 discloses a method for producing a vinyl chloride-based resin which does not include a plasticizer.

However, when making the recording medium a 3-layer structure, it is possible to avoid image quality defects such as aggregation of ink by optimizing the ink fixing layer; however, a process for laminating the recording medium is necessary and the manufacturing cost is remarkably high. In addition, the drying speed of the vinyl chloride-based resin which is disclosed in JP-A-2011-25518 is fast due to a plasticizer not being included therein and image quality defects such as aggregation of ink during high density printing are not easily generated; however, the dimensional stability is poor and the recording medium may contract when dried at a high temperature of approximately 50° C. to 70° C., particularly after high density printing.

SUMMARY

An advantage of some aspects of the invention is that it provides an ink jet recording method, an ink jet recording apparatus, and a method for manufacturing a recording medium with which high density printing is possible using an ink jet recording method, in which recording is carried out on a recording medium which is formed of a vinyl chloride-based resin using solvent-based ink, and with which the obtained recorded matter has high dimensional stability and the obtained image is provided with a fastness.

The invention can be realized in the following aspects or application examples.

Application Example 1

According to an aspect of the invention, there is provided an ink jet recording method for carrying out recording on a recording medium which is formed of a vinyl chloride-based resin by discharging solvent-based ink from an ink jet head, in which the recording medium satisfies (1), (2), and (3) described below, (1): an FT-IR peak wavenumber is less than 2924 cm$^{-1}$ (2): a contraction rate before and after leaving at 60° C. for 3 hours is less than 1.8%

(3): none of a phthalate ester-based plasticizer, a phosphate ester-based plasticizer, and a fatty acid ester-based plasticizer are included.

According to the aspect of Application Example 1, high density printing is possible using a recording medium which is formed of a vinyl chloride-based resin satisfying (1), (2), and (3) described above and, moreover, the recording medium does not contract even when dried at a high temperature after the high density printing. For this reason, the recorded matter which is obtained by the recording method has high dimensional stability and the obtained image is provided with fastnesses.

Application Example 2

In the application example described above, the solvent-based ink may be an ink which includes at least one selected from a polyoxyethylene glycol-based solvent which is represented by General Formula (1) described below and a lactone-based solvent,

$$R^{11}-(OC_2H_4)_n-OR^{12} \quad (1)$$

(in General Formula (1), $R^{11}$ and $R^{12}$ are alkyl groups having 1 to 3 carbon atoms and may be the same or different, and n is an integer of 2 to 4).

Application Example 3

In the application example described above, the lactone-based solvent may be γ-butyrolactone or γ-valerolactone.

Application Example 4

In the application example described above, $R^{11}$ and $R^{12}$ in General Formula (1) may be straight-chain or branched alkyl groups and a boiling point may be 150° C. or more under atmospheric pressure.

Application Example 5

In the application example described above, the solvent-based ink may further contain a binder resin.

Application Example 6

In the application example described above, the binder resin may be a (meth)acryl resin.

Application Example 7

According to another aspect of the invention, there is provided an ink jet recording apparatus which carries out recording using the ink jet recording method according to the application examples described above.

Application Example 8

According to still another aspect of the invention, there is provided a method for manufacturing a recording medium used in a ink jet recording method, in which the vinyl chloride-based resin is obtained by copolymerizing (A)

vinyl chloride-based monomer and (B) macromonomer which has a polymer formed of acrylic acid-n-butyl in a main chain by a suspension polymerization method in a range of (A)/(B)=85 mass %/15 mass % to 75 mass %/25 mass %.

Application Example 9

In the application example described above, an aging treatment is performed by heating on the vinyl chloride-based resin.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
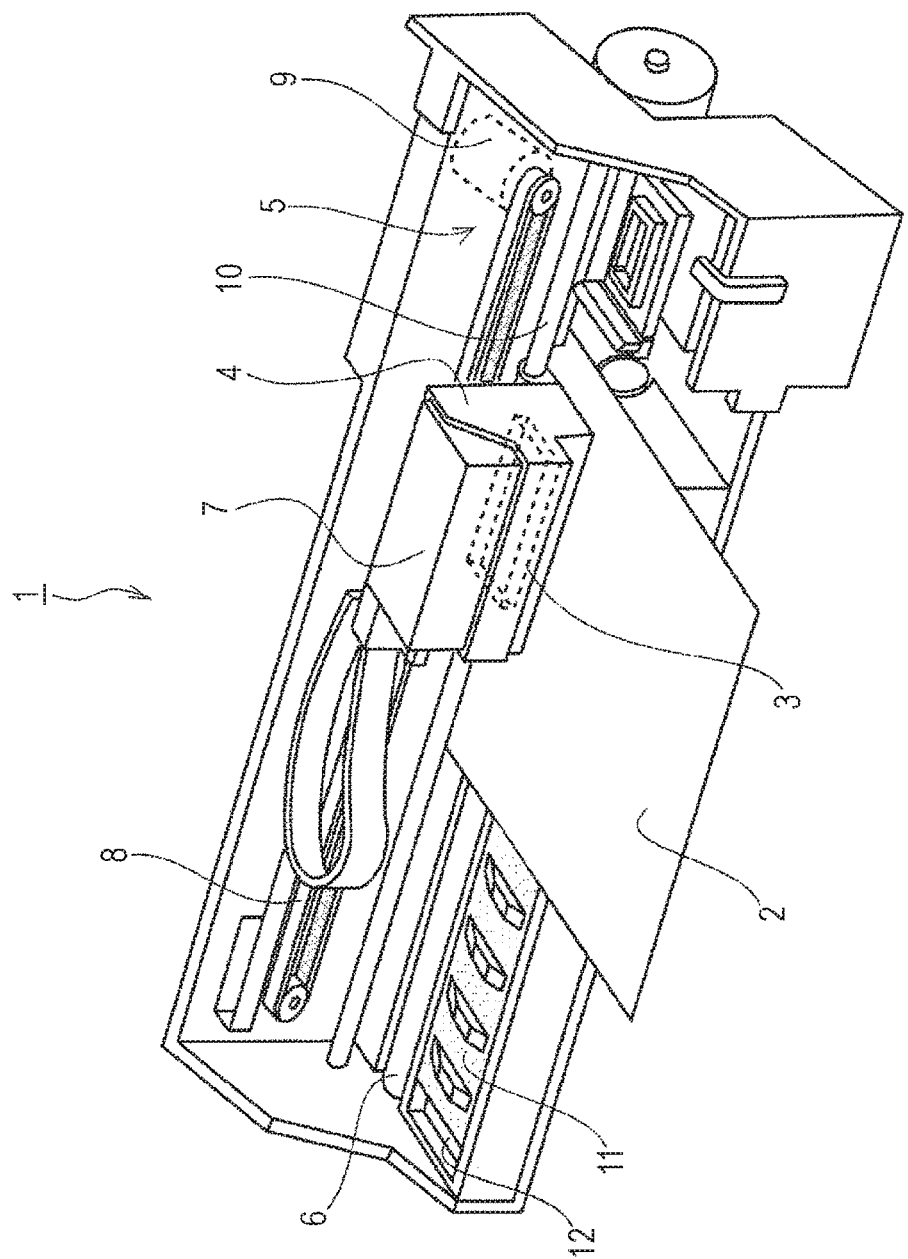
FIG. 1 is a diagram which schematically shows an example of an ink jet recording apparatus which performs an ink jet recording method according to the present embodiment.

Detailed description will be given below of a favorable embodiment of the invention. Here, the invention is not limited to the embodiment described below and also includes various types of modification examples which are carried out within a range which does not depart from the gist of the invention. Here, the same reference numerals are given to the same elements in the diagrams and overlapping description thereof will be omitted. In addition, unless otherwise stated, positional relationships such as up, down, left, and right are based on the positional relationship shown in the diagrams. Furthermore, the dimensional ratios in the diagrams are not limited to the illustrated ratios.

The ink jet recording method of the present embodiment carries out recording on a recording medium formed of a vinyl chloride-based resin by discharging solvent-based ink from an ink jet head and the recording medium satisfies (1), (2), and (3) described below.

(1): an FT-IR peak wavenumber is less than 2924 $cm^{-1}$ (2): a contraction rate before and after leaving at 60° C. for 3 hours is less than 1.8%

(3): none of a phthalate ester-based plasticizer, a phosphate ester-based plasticizer, and a fatty acid ester-based plasticizer are included.

After describing the configuration of the ink jet recording apparatus which carries out recording using the ink jet recording method according to the present embodiment, a solvent-based ink, and a recording medium in this order, description will be given below of an ink jet recording method.

Here, "solvent-based ink" in the invention refers to a "solvent-based ink jet ink composition" which is used for an ink jet recording method and is an ink which has an organic solvent as a main solvent and does not have water as the main solvent. The content of water in the ink is preferably 3 mass % or less, more preferably 1 mass % or less, even more preferably less than 0.05 mass %, still more preferably less than 0.01 mass %, yet more preferably less than 0.005 mass %, and most preferably less than 0.001 mass %.

Alternatively, the ink composition may be an ink composition which substantially does not contain water. "Substantially does not contain" has the meaning of not being intentionally contained. In a case of containing other components than an organic solvent such as a coloring material or resin, it is possible to set the content of the organic solvent in the solvent-based ink as the remainder after excluding the other components, for example, 70 mass % or more, even 80 mass % or more, and it is possible to make the upper limit of the content 100 mass % or less, even 99 mass % or less.

In addition, since a solvent-based ink has an organic solvent as a main solvent, it is possible to form an image which is excellent in fastnesses such as water resistance and there is an advantage in that the drying property is excellent when attached to a recording medium with low absorbency. Furthermore, by carrying out the recording on a recording medium which is used for the ink jet recording method according to the present embodiment, high density printing in which the ink duty is 90% or more is possible and, moreover, since the recording medium does not contract even when dried at a high temperature after the high density printing, the obtained recorded matter has high dimensional stability and the obtained image is provided with fastnesses.

1. Each Configuration 1.1. Ink Jet Recording Apparatus

Description will be given of an example of the ink jet recording apparatus which is used for the ink jet recording method according to the present embodiment with reference to the diagrams. Here, the ink jet recording apparatus which is able to be used for the ink jet recording method according to the present embodiment is not limited to the aspect below.

Examples of the ink jet apparatus according to the present embodiment include an ink jet printer (below, printer) in which an ink jet head shown in FIG. 1 is mounted. As shown in FIG. 1, a printer 1 is an apparatus which records images or the like by ejecting ink in liquid form onto a surface of a recording medium 2. The printer 1 is provided with an ink jet head 3, a carriage 4 to which the ink jet head 3 is attached, a carriage moving mechanism 5 which moves the carriage 4 in a main scanning direction (the longitudinal direction of the printer 1, that is, the width direction of the recording medium 2), and a transport mechanism 6 which transports the recording medium 2 in a sub scanning direction (a direction which is orthogonal to the main scanning direction), and the like.

Here, a solvent-based ink which is used in the ink jet recording method according to the present embodiment is stored in an ink cartridge 7. The ink cartridge 7 is mounted to be able to be attached and detached with respect to the ink jet head 3. Here, it is also possible to adopt a configuration in which the ink cartridge 7 is disposed on the main body side of the printer 1 and ink is supplied to the ink jet head 3 from the ink cartridge 7 through an ink supplying tube.

The carriage moving mechanism 5 described above is provided with a timing belt 8. Then, the timing belt 8 is driven by a pulse motor 9 such as a DC motor. Therefore, when the pulse motor 9 is operated, the carriage 4 is guided by a guide rod 10 which is built in the printer 1 and moves forward and backward in the main scanning direction.

A platen 11 is disposed below the ink jet head 3 at the time of recording operation. The platen 11 is disposed to be spaced at an interval with respect to a nozzle forming surface (a nozzle plate, which is not shown in the diagram) of the ink jet head 3 when performing the recording operation and supports the recording medium 2. In addition, a flashing box 12 which is a preliminary discharging member is provided at an end portion of the platen 11 in the main scanning direction, specifically, in a region which is separated from a region (a recording region) where ink is ejected onto the recording medium 2 which is disposed in the platen 11.

The ink jet head 3 is a means for attaching solvent-based ink to the recording medium 2 and is provided with nozzles (which are not shown in the diagram) which discharge the solvent-based ink. Examples of the method of discharging a reaction liquid or an ink composition from nozzles include a method (an electrostatic suction method) of applying a strong electric field between nozzles and accelerating electrodes which are disposed in front of the nozzles, continuously discharging a reaction liquid in a liquid droplet form from the nozzles, and carrying out the discharging in correspondence with a recording information signal while the liquid droplets of the reaction liquid are flying between deflecting electrodes; a method of forcibly discharging liquid droplets of a reaction liquid by applying pressure to the reaction liquid by a small pump and mechanically vibrating nozzles with a crystal vibrator or the like; a method (a piezo method) of applying pressure to a reaction liquid using a piezoelectric element at the same time as a recording information signal and discharging and recording the liquid droplets of the reaction liquid; a method (a thermal jet method) of heating and foaming a resin liquid using minute electrodes according to a recording information signal and discharging and recording the liquid droplets of the reaction liquid, and the like.

It is possible to use either a line type ink jet head or a serial type ink jet head as the ink jet head 3; however, a serial type ink jet head is used in the present embodiment.

Here, the ink jet recording apparatus which is provided with a serial type ink jet head performs recording by scanning (passes) which discharges the ink composition while relatively moving the ink jet head for recording with respect to a recording medium a plurality of times. Specific examples of the serial type ink jet head include a serial type ink jet head in which an ink jet head is mounted in a carriage which moves in the width direction of a recording medium (a direction which intersects with the transport direction of the recording medium) and which discharges liquid droplets onto the recording medium as the ink jet head moves along with the movement of the carriage.

On the other hand, an ink jet recording apparatus which is provided with a line type ink jet head performs recording by scanning (a pass) which discharges the ink composition while relatively moving the ink jet head with respect to a recording medium once. Specific examples of line type ink jet heads include a line type ink jet head in which the ink jet head is formed to be wider than the width of the recording medium and the ink jet head discharges liquid droplets on the recording medium without moving.

Here, although not shown in the diagram, a drying means is provided in the ink jet apparatus according to the present embodiment. By providing the drying means, it is possible to quickly form a recorded image or the like by quickly evaporating and dispersing the liquid medium from the ink which is attached to the recording medium. The drying means which is able to be adopted as the drying means is not particularly limited as long as the drying means is provided with a configuration which promotes the evaporation and dispersion of a liquid medium which is included in ink. Examples thereof include a means of heating a recording medium, a means of blowing wind to a reaction liquid, moreover, a means which combines the above, and the like.

In detail, it is preferable to use forced air heating, radiant heating, conductive heating, high frequency drying, microwave drying, or the like.

In addition, the drying by the drying means is preferably drying by heating, and the ink jet recording apparatus preferably performs the recording by discharging onto a heated recording medium. The heating method is not particularly limited; however, examples thereof include a heat press method, a normal pressure steam method, a high pressure steam method, and a thermofix method, and examples of the heating means of the recording medium include infrared radiation (a lamp). In this case, the temperature of the heated recording medium is preferably 50° C. or more and 70° C. or less, and more preferably 50° C. or more and 60° C. or less.

1.2. Solvent-Based Ink

Next, description will be given of a solvent-based ink which is used for the ink jet recording method according to the present embodiment. The solvent-based ink which is used in the present embodiment is ink which includes at least one selected from a polyoxyethylene glycol-based solvent which is represented by General Formula (1) described below and a lactone-based solvent.

(in General Formula (1), $R^{11}$ and $R^{12}$ are alkyl groups having 1 to 3 carbon atoms and may be the same or different, and n is an integer of 2 to 4).

By using the polyoxyethylene glycol-based solvent which is represented by General Formula (1) described above or a lactone-based solvent individually or together, the solvent-based ink which is used in the present embodiment is excellent in a levelling property and drying property when used as ink. In addition, the polyoxyethylene glycol-based solvent which is represented by General Formula (1) and a lactone-based solvent have a high boiling point and low evaporation pressure and are excellent in workplace environments. Detailed description will be given below of components which are included and which may be included in the solvent-based ink which is used in the present embodiment.

1.2.1. Polyoxyethylene Glycol-Based Solvent Represented by General Formula (1)

The solvent-based ink which is used in the present embodiment uses the polyoxyethylene glycol-based solvent which is represented by General Formula (1) individually or as a mixed solvent with a lactone-based solvent which will be described below.

(in General Formula (1), $R^{11}$ and $R^{12}$ are alkyl groups having 1 to 3 carbon atoms and may be the same or different, and n is an integer of 2 to 4).

Regarding the polyoxyethylene glycol-based solvent which is represented by General Formula (1), $R^{11}$ and $R^{12}$ in General Formula (1) are straight-chain or branched alkyl groups having 1 to 3 carbon atoms and the boiling point is 150° C. or more under atmospheric pressure, and preferably 180° C. or more. The upper limit thereof is not particularly defined, but is approximately 240° C. in terms of functionality for ink jet recording. In addition, the density at 20° C. is 0.9 g/cm$^3$ or more.

In General Formula (1) described above, examples of $R^{11}$ and $R^{12}$ specifically include a methyl group, an ethyl group, an n-propyl group, and an iso-propyl group. Regarding the polyoxyethylene glycol-based solvent which is represented by General Formula (1), it is possible to use one type individually or a mixture of two or more types.

Examples of polyoxyethylene glycol-based solvents include diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, diethylene glycol ethyl methyl ether, triethylene glycol ethyl methyl ether, tetraethylene glycol ethyl methyl ether, diethylene glycol-di-n-propyl ether, diethylene glycol-di-iso-propyl ether, and the like; however, diethylene glycol diethyl ether, triethylene glycol dimethyl ether, and diethylene glycol ethyl methyl ether are preferable.

Regarding the content of the solvent which is a compound which is represented by General Formula (1) described above which is included in the solvent-based ink, the lower limit value thereof is preferably 10 mass % or more with respect to the total mass (100 mass %) of the solvent-based ink, more preferably 20 mass % or more, and even more preferably 30 mass % or more. In addition, the upper limit value thereof is preferably 95 mass % or less, more preferably 90 mass % or less, and even more preferably 85 mass % or less. By the content being 20 mass % or more, the wet spreading property of liquid droplets is improved and it is possible to form a favorable image with excellent smoothness. In addition, by the content being 95 mass % or less, the contamination of images due to the generation of mist is suppressed.

1.2.2. Lactone-Based Solvent

The solvent-based ink which is used in the present embodiment uses a lactone-based solvent individually or as a mixed solvent with the polyoxyethylene glycol-based solvent which is represented by General Formula (1) described above. By the solvent-based ink including the lactone-based solvent, it is possible to make the solvent-based ink permeate into the recording medium by dissolving a part of the recording surface of the recording medium formed of a vinyl chloride-based resin. By ink permeating into the recording medium in this manner, it is possible to improve the scratch resistance (friction fastness) of the image which is recorded on the recording medium. In other words, since the lactone-based solvent has high compatibility with a vinyl chloride-based resin, components of the solvent-based ink easily infiltrate (to easily bite into) the recording surface. As a result of the lactone-based solvent having this effect, the solvent-based ink in which the lactone-based solvent is blended is able to be excellent in the polyvinyl chloride substrate permeability, levelling property, and printing drying property.

The lactone-based solvent is a compound which has a cyclic structure formed by an ester bond and examples thereof include γ-lactone with a 5-membered ring structure, δ-lactone with a 6-membered ring structure, ε-lactone with a 7-membered ring structure, and the like, and examples thereof include γ-butyrolactone, γ-valerolactone, γ-hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, δ-undecalactone, and ε-caprolactam. Here, the number of ring members of the hetero ring of the lactone-based solvent is not particularly limited and, moreover, for example, an arbitrary side chain may be bonded to a ring member of the hetero ring. In addition, the lactone-based solvent may be used as one type individually or may be used in a mixture of two or more types.

Among these, the lactone-based solvent is preferably γ-lactone with a 5-membered ring structure and more preferably does not have a side chain, and γ-butyrolactone and γ-valerolactone are preferable. Since the lactone-based solvent has high compatibility with a polyvinyl chloride in particular, the polyvinyl chloride substrate permeability, levelling property, printing drying property, and image scratch resistance are excellent.

The content with respect to the total amount of the solvent-based ink in a case of blending the lactone-based solvent (the total amount in a case of using a plurality of types) is 5 mass % or more and 50 mass % or less, preferably 7 mass % or more and 30 mass % or less, and more preferably 10 mass % or more and 20 mass % or less.

In addition, in a case of mixing the polyoxyethylene glycol-based solvent which is represented by General Formula (1) and the lactone-based solvent for use as a mixed solvent, the ratio of each in the mixed solvent is 0.02 parts by weight to 4 parts by weight of the lactone-based solvent with respect to 1 part by weight of the polyoxyethylene glycol-based solvent which is represented by General Formula (1), preferably 0.05 parts by weight to 2 parts by weight. In addition, the mixed solvent may be contained as at least 50 mass % in the solvent-based ink, and preferably contained as 70 mass % or more. Due to this, the polyvinyl chloride substrate permeability, levelling property, and printing drying property are excellent.

1.2.3. Other Solvents

In the solvent-based ink which is used in the present embodiment, for the purpose of suppressing volatilization of the solvent-based ink in equipment such as nozzle portions or inside a tube, preventing solidification, and also for re-dissolvability when solidified, at least one type of solvent selected from polyoxyethylene glycol monoalkyl ether which is represented by General Formula (2) described below, polyoxypropylene glycol monoalkyl ether which is represented by General Formula (3) described below, and triethyl citrate may be used together with the solvent described above.

$$R^{21}-(OC_2H_4)_n-OH \qquad (2)$$

(in General Formula (2), $R^{21}$ is an alkyl group having 1 to 6 carbon atoms, and n is an integer of 3 to 6).

$$R^{31}-(OC_2H_4)_n-OH \qquad (3)$$

(in General Formula (3), $R^{31}$ is an alkyl group having 1 to 4 carbon atoms, and n is an integer of 2 or 3).

In the polyoxyethylene glycol monoalkyl ether which is represented by General Formula (2), $R^{21}$ is an alkyl group having 1 to 6 carbon atoms, preferably with 1 to 4 carbon atoms, and n is an integer of 3 to 6, and examples thereof include triethylene glycol monomethyl ether, triethylene glycol monobutyl ether, tetraethylene glycol monomethyl ether, tetraethylene glycol monobutyl ether, pentaethylene glycol monomethyl ether, and hexaethylene glycol monomethyl ether as individual examples, or mixtures of these. The boiling point under atmospheric pressure is 200° C. to 305° C., and preferably 240° C. to 305° C.

In addition, for the purpose of the same effect as the compound of General Formula (2) described above, a nonionic polyoxyethylene derivative may be added in a liquid form at a room temperature under atmospheric pressure as described below. Examples thereof include polyoxyethylene cetyl ethers such as NISSAN NONION P-208 (produced by NOF Corp.) which is a polyoxyethylene alkyl ether, polyoxyethylene oleyl ethers such as NISSAN NONION ε-202S and ε-205S (produced by NOF Corp.), polyoxyethylene lauryl ethers such as EMULGEN 106 and 108 (produced by Kao Corp.), polyoxyethylene octyl phenol ethers such as NISSAN NONION HS-204, HS-205, HS-206, and HS-208 (produced by NOF Corp.) which are polyoxyethylene alkyl phenol ethers, sorbitan monocaprylate such as NISSAN NONION CP-08R (produced by NOF Corp.) which is sorbitan monoesters, sorbitan monolaurate such as NISSAN NONION LP-20R (produced by NOF Corp.), polyoxyethylene sorbitan monostearates, such as NISSAN NONION OT-221 (produced by NOF Corp.) which is polyoxyethylene sorbitan monoesters, polycarboxylic acid polymer activators such as FLORENE G-70 (produced by Kyoeisha Chemical Co., Ltd.), polyoxyethylene higher alcohol ethers such as EMULGEN 707 and 709 (produced by Kao Corp.), tetraglycerine olates such as POEM J-4581 (produced by Riken Vitamin Co., Ltd.), nonylphenol ethoxylates such as ADEKATOL NP-620, NP-650, NP-660, NP-675, NP-683, and NP-686 (produced by Adeka Corp.), aliphatic phosphoric acid esters such as ADEKACOL CS-141E and TS-230E (produced by Adeka Corp.), sorbitan sesqui olate such as SORGEN 30 (produced by Dai-ichi Kogyo Seiyaku Co., Ltd.), sorbitan monoolate such as SORGEN 40 (produced by Dai-ichi Kogyo Seiyaku Co., Ltd.), polyethylene glycol sorbitan monolaurate such as SORGEN TW-20 (produced by Dai-ichi Kogyo Seiyaku Co., Ltd.), and polyethylene glycol sorbitan monoolate such as SORGEN TW-80 (produced by Dai-ichi Kogyo Seiyaku Co., Ltd.). In addition, examples thereof include an acetylene glycol-based surfactant which is represented by General Formula (4) described below.

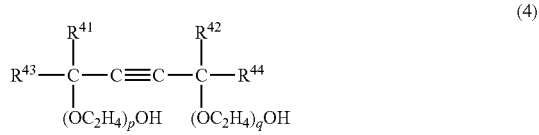

(4)

(in General Formula (4), $0 \le p+q \le 50$, $R^{41}$, $R^{42}$, $R^{43}$, and $R^{44}$ are alkyl groups, preferably alkyl groups having 1 to 6 carbon atoms). Specific examples thereof include 2,4,7,9-tetramethyl-5-decyne-4,7-diol, 3,6-dimethyl-4-octyne-3,6-diol, 3,5-dimethyl-1-hexyne-3-ol, and the like, and examples of commercial products include SURFYNOL 104, 82, 465, and 485, or TG (the above are all available from Air Products and Chemicals, Inc.), OLFIN STG and OLFIN E1010 (produced by Nissin Chemical Industry Co., Ltd.), NISSAN NONION A-10R and A-13R (produced by NOF Corp.), FLORENE TG-740W and D-90 (produced by Kyoeisha Chemical Co., Ltd.), EMULGEN A-90 and A-60 (produced by Kao Corp.), NOIGEN CX-100 (produced by Dai-ichi Kogyo Seiyaku Co., Ltd.), and the like. The polyoxyethylene derivatives may be added individually or in a mixture.

In addition, examples of the polypropylene glycol monoalkyl ether which is represented by General Formula (3) described above include dipropylene glycol monomethyl ether, dipropylene glycol monoethyl ether, dipropylene glycol monopropyl ether, dipropylene glycol monobutyl ether, tripropylene monomethyl ether, and the like as individual examples, or a mixture of these and the boiling point under atmospheric pressure is 170° C. to 245° C., preferably 180° C. to 240° C.

Regarding each of the solvents of General Formulas (2) and (3) described above and triethyl citrate, by imparting volatilization suppressing property to a solvent-based ink, it is possible to prevent or reduce a solid content from accumulating in a tube by suppressing evaporation of an ink composition in a tube in which an ink composition is transported from an ink cartridge to a printer head, and the content is 0.01 to 48 mass % in the solvent-based ink and preferably 5 to 30 mass %.

In addition, each of the solvents of General Formulas (2) and (3) described above and triethyl citrate may be used individually; however, it is possible to adjust the physical properties such as the dispersion stability of a coloring material, the control of ink volatility, and the viscosity by adding the solvents in a combination of a plurality thereof.

Next, description will be given of components which are dispersed or dissolved in the solvent described above in the solvent-based ink which is used in the present embodiment.

1.2.4. Coloring Material

It is possible to use pigments such as an inorganic pigment or an organic pigment which are generally used for the solvent-based ink in the related art, individual dyes, or mixtures thereof as a coloring material. It is possible to use carbon black, cadmium red, molybdenum red, chrome yellow, cadmium yellow, titanium yellow, chrome oxide, viridian, titanium cobalt green, ultramarine blue, Prussian blue, cobalt blue, diketo-pyrrolo-pyrrole, anthraquinone, benzimidazolone, anthrapyrimidine, azo-based pigments, phthalocyanine-based pigments, quinacridone-based pigments, isoindolinone-based pigments, dioxazine-based pigments, threne-based pigments, perylene-based pigments, perinone-based pigments, thioindigo-based pigments, quinophthalone-based pigments, metal complex pigments, and the like as a pigment. It is possible to use, for example, azo dye, metal complex dye, naphthol dye, anthraquinone dye, indigo dye, carbonium dye, quinone imine dye, xanthine dye, cyanine dye, quinoline dye, nitro dye, nitroso dye, benzoquinone dye, naphthoquinone dye, phthalocyanine dye, or metal phthalocyanine dye as a dye, and an oil soluble dye is particularly preferable. It is also possible to use the pigments or dyes individually or use in a combination of two types or more thereof; however, a pigment is preferable from the point of view of weather resistance. The volume average particle diameter of a pigment primary particles is 50 to 500 nm, preferably 50 to 200 nm.

The content of a coloring material is 0.5 to 25 mass %, preferably 0.5 to 15 mass %, and more preferably 1 to 10 mass % in the solvent-based ink.

1.2.5. Dispersing Agent

It is possible to use an arbitrary dispersing agent which is used in a general solvent-based ink, particularly a solvent-based ink for ink jet recording, as a dispersing agent. As a dispersing agent, it is preferable to use a dispersing agent which effectively works when the solubility parameters of the organic solvent are 8 to 11. It is possible to use a commercially available product as the dispersing agent and specific examples thereof include polyester-based polymer compounds such as HINOACT KF1-M, T-6000, T-7000, T-8000, T-8350P, and T-8000EL (produced by Takefu Fine Chemicals Co., Ltd.), SOLSPERSE 20000, 24000, 32000, 32500, 33500, 34000, and 35200 (produced by Nitto Denko Avecia Inc.), DISPERBYK-161, 162, 163, 164, 166, 180, 190, 191, and 192 (produced by BYK Japan KK), FLORENE DOPA-17, 22, 33, and G-700 (produced by Kyoeisha Chemical Co., Ltd.), AJISPER PB821 and PB711 (produced by Ajinomoto Co., Inc.), and LP4010, LP4050, and LP4055, Polymer 400, 401, 402, 403, 450, 451, and 453 (produced by Efka Chemicals Corp.) as individual examples, or mixtures thereof.

The content of the dispersing agent in the solvent-based ink is 5 to 200 mass % with respect to the content of the coloring material (particularly the pigment) in the ink composition, and preferably 30 to 120 mass % and may be appropriately selected according to the coloring material to be dispersed.

1.2.6. Binder Resin

The solvent-based ink which is used in the present embodiment preferably includes a binder resin. The binder resin has dissolvability in a solvent base and is added for the purpose of adjusting the viscosity of a solvent-based ink and also the fixation to a polyvinyl chloride substrate, and it is possible to use, for example, an acryl resin, a styrene acryl resin, a rosin-modified resin, a phenol resin, a terpene-based resin, a polyester resin, a polyamide resin, an epoxy resin, a vinyl chloride vinyl acetate copolymer resin, a cellulosic resin such as cellulose acetate butylate, a vinyltoluene-α-methyl styrene copolymer resin, and the like as individual examples, or a mixture thereof.

The binder resin is preferably a (meth)acryl resin, that is, an acryl resin or a methacryl resin, and, in a more preferable aspect, an individual polymer of individual methyl methacrylate or a copolymer of methyl methacrylate and butyl methacrylate.

In addition, the molecular weight of the (meth)acryl resin is 10000 to 150000 and preferably 10000 to 100000 and a glass transition temperature (Tg) is 40° C. or more and the upper limit is not particularly limited but is preferably 105° C.

In addition, the (meth)acryl resin is preferably used together with a vinyl chloride vinyl acetate copolymer resin and/or a cellulosic resin such as cellulose acetate butylate, is superior in adhesiveness with respect to a substrate, and also is useful for adjusting the viscosity of the ink.

The content of the binder resin is 0.5 to 3 times with respect to the coloring material adding amount (weight), preferably 0.75 to 1.6 times.

1.2.7. Other Components

A stabilizer such as an antioxidant or an ultraviolet absorber, a surfactant, or the like may be added to the solvent-based ink which is used in the present embodiment. Examples of antioxidants include BHA (2,3-butyl-4-oxyanisole), BHT (2,6-di-t-butyl-p-cresol), and the like, and the content thereof is 0.01 to 3.0 mass % in the solvent-based ink. In addition, it is possible to use a benzophenone-based compound or a benzotriazole-based compound as an ultraviolet absorber and the content thereof is 0.01 to 0.5 mass % in the solvent-based ink. In addition, it is possible to use any of anion-based, cation-based, amphoteric, or non-ionic surfactants as a surfactant and the content thereof is 0.5 to 4.0 mass % in the solvent-based ink.

1.2.8. Method for Preparing Solvent-Based Ink

As a method for preparing the solvent-based ink which is used in the present embodiment, the solvents described above are mixed in an arbitrary order to make a solvent, pigments and a dispersing agent are added to a part of the solvent, and a pigment dispersing liquid is prepared by mixing and dispersing by a ball mill, a bead mill, ultrasonic waves, a jet mill, or the like. It is possible to obtain the solvent-based ink by adding the remainder of the obtained solvent, a binder resin, and other additive agents to the obtained pigment dispersing liquid while stirring and removing impurities by carrying out filtering or the like as necessary.

1.2.9. Physical Properties of Solvent-Based Ink

The solvent-based ink which is used in the present embodiment is prepared such that the viscosity at 20° C. is 2 to 10 mPa·s, preferably 3 to 5 mPa·s.

In addition, the surface tension in the solvent-based ink which is used for the present embodiment may be 20 to 50 mN/m. When the surface tension is less than 20 mN/m, the ink composition wets and spreads on the surface of the ink jet head or bleeds and there are cases where the discharge of ink droplets is difficult. In addition, when the surface tension exceeds 50 mN/m, the ink composition does not wet or spread on the surface of the recording medium and there are cases where it is not possible to carry out favorable printing.

Since the solvent-based ink of the invention has an advantage of being inactive with respect to the discharge nozzle surface on which ink repelling treatment is carried out, for example, it is possible to use the solvent-based ink advantageously in an ink jet recording method which discharges the ink from the ink jet head which has the discharge nozzle surface on which ink repelling treatment is carried out.

1.3. Recording Medium

Next, description will be given of the recording medium which is used in the present embodiment. The recording medium which is used in the present embodiment is formed of a vinyl chloride-based resin and satisfies (1), (2), and (3) described below.

(1): an FT-IR peak wavenumber is less than 2924 $cm^{-1}$ (2): a contraction rate before and after leaving at 60° C. for 3 hours is less than 1.8%

(3): none of a phthalate ester-based plasticizer, a phosphate ester-based plasticizer, and a fatty acid ester-based plasticizer are included.

In the ink jet recording method according to the present embodiment, by satisfying the three conditions described above as a recording medium to be used, high density printing is possible and moreover, the recording medium does not contract even when dried at a high temperature after the high density printing. For this reason, the recorded matter which is obtained by the recording method has high dimensional stability and the images obtained by carrying out recording by using the solvent-based ink described above are provided with fastnesses.

In particular, the recording medium which is used in the present embodiment does not include a phthalate ester-based plasticizer, a phosphate ester-based plasticizer, or a fatty acid ester-based plasticizer as a plasticizer. A plasticizer is generally included in a vinyl chloride-based resin at 30 to 50 mass %. For the plasticizers, for example, the SP value of dioctyl phthalate is 7.9 $cal/cm^3$, the SP value of dibutyl phthalate is 9.3 $cal/cm^3$, and the SP value of dioctyl adipate is 8.7 $cal/cm^3$, and these are close to the SP value of the solvent which is a compound which is represented by General Formula (1) described above which is a main component of the solvent-based ink, for example, diethylene glycol diethyl ether (DEDG) or diethylene glycol methyl ethyl ether (MEDG) (DEDG: 8.6 $cal/cm^3$ and MEDG: 8.3 $cal/cm^3$). Since the plasticizers have high compatibility with a polyoxyethylene glycol-based solvent, a lactone-based solvent, or the like which is a solvent which is used for the solvent-based ink described above, when the plasticizers are included in the recording medium, the solvent of the solvent-based ink is accumulated in the recording medium and the volatility of the solvent is decreased, which is a cause of the ink drying property deteriorating. For this reason, when performing high density printing in particular, aggregation of ink or the like is generated and image quality defects are generated. With respect to this, since the recording medium which is used in the present embodiment does not include the plasticizer, the recording medium is a recording medium with quick drying property which is excellent in terms of solvent volatility and where the solvent of the solvent-based ink is not accumulated in the recording medium, and the aggregation of ink or the like in high density printing is suppressed.

In addition, since, in the recording medium which is used in the present embodiment (1): an FT-IR peak wavenumber is less than 2924 cm$^{-1}$ and (2): a contraction rate before and after leaving at 60° C. for 3 hours is less than 1.8%, even when performing forced drying, for example, heating at 50° C. or more or infrared ray irradiation in order to increase the drying speed of ink after the high density printing, the recording medium does not contract and is excellent in dimensional stability.

In the conditions described above, (1) has the meaning that the wavenumber (cm$^{-1}$) of the absorption peak based on the stretching vibration of a CH bond of alkane is measured to be less than 2924 cm$^{-1}$ when measuring the infrared absorption spectrum of a vinyl chloride resin-based substrate surface which forms the recording medium using Fourier transform infrared spectroscopy (FT-IR). In a case where molecular vibration which indicates a CH bond is shifted to a low wavenumber side along with the relaxation of inner stress of a vinyl chloride resin-based substrate and the FT-IR peak wavenumber on the recording surface of the recording medium which is used in the present embodiment is less than 2924 cm$^{-1}$, the recording medium is a recording medium of which the contraction rate due to heat is low and which is excellent in dimensional stability.

In the measurement of the infrared absorption spectrum of the recording medium which is used in the present embodiment, the method for measuring the infrared absorption spectrum is preferably an attenuated total reflection (ATR) method. Since the infrared absorption spectrum is measured by reflected light in the ATR method, it is possible to measure the vinyl chloride resin-based substrate surface with high precision without destroying the substrate surface.

The contraction rate of (2), which is one of the conditions described above, is able to be determined by the dimensional change before and after leaving at 60° C. for 3 hours and is determined by the equation described below.

Contraction rate (%)={(length before leaving)−(length after leaving)}/(length before leaving)×100

Regarding the recording medium which is used in the present embodiment, since the contraction rate (%) before and after leaving at 60° C. for 3 hours is less than 1.8% in either of a width direction or length direction of the recording medium, even when performing forced drying in order to increase the drying speed of the ink after the high density printing, the recording medium does not contract and is excellent in dimensional stability.

In order to change the image quality and appearance, an image quality control is preferably carried out on the printing surface of the recording medium which is used in the present embodiment for the glossiness, matte quality, or the like and an embossing process may be carried out by embossing or foaming. In a case where an embossing process is carried out, since a contact area with a rear surface material is reduced after printing, sticking is prevented when winding a roll. In addition, since the drying property after winding is also improved, in a case of forming a laminate film or a liquid laminate on a printing surface after printing, it is possible to shorten the time until lamination.

It is possible to produce the vinyl chloride-based resin composition which forms the recording medium which is used in the present embodiment, for example, by the method described in JP-A-2011-25518.

The vinyl chloride-based resin composition is one type of resin composition which has a resin which is obtained by copolymerizing a vinyl chloride-based monomer and a macromonomer which has a polymer formed of an ethylenically unsaturated monomer which contains a double bond in a main chain as a main component and specifically, a resin composition which has a resin which is obtained by copolymerizing (A) vinyl chloride-based monomer and (B) macromonomer which has a polymer formed of acrylic acid-n-butyl in the main chain by a suspension polymerization method in a range of (A)/(B)=85 mass %/15 mass % to 75 mass %/25 mass % as a main component.

The vinyl chloride-based monomer which forms the resin which is used in the present manufacturing method is not particularly limited and, for example, one type or a mixture of two or more types may be used selected from a vinyl chloride monomer, a vinylidene chloride monomer, a vinyl acetate monomer, or a mixture of these, or, other than these, a monomer which is able to be copolymerized with these, which preferably does not have a reactive functional group in a polymer main chain after polymerization, for example, α-olefins such as ethylene and propylene. In a case of using a mixture of two or more types, the content ratio of the vinyl chloride monomer in the entirety of the vinyl chloride-based monomer is preferably 50 mass % or more, and particularly preferably 70 mass % or more. According to the physical properties or the like of the obtained copolymer resin among these, only one type of either a vinyl chloride monomer or a vinylidene chloride monomer is preferably used, and a vinyl chloride monomer is more preferably used.

In general, a macromonomer is an oligomer molecule which has a reactive functional group in the terminal of a polymer. A macromonomer which has a polymer formed of acrylic acid-n-butyl in a main chain has at least one of an allyl group, a vinylsilyl group, a vinyl ether group, a dicyclopentadienyl group, and a group which has a polymerizable carbon-carbon double bond selected from General Formula (a) described below for each molecule in a molecular terminal as a reactive functional group and is produced by radical polymerization. In particular, since the reactivity with a vinyl chloride-based monomer is favorable, a group which has a polymerizable carbon-carbon double bond is preferably a group which is represented by General Formula (a) described below:

—OC(O)C(R)=CH$_2$     (a).

Specific examples of R in Formula (a) are not particularly limited and for example, a group selected from —H, —CH$_3$, —CH$_2$CH$_3$, —(CH$_2$)nCH$_3$ (n represents an integer of 2 to 19), —C$_6$H$_5$, —CH$_2$OH, and —CN is preferable and —H and —CH$_3$ are more preferable.

Next, description will be given of a method for producing a sheet (a substrate) of a resin composition.

Firstly, a calendar processing apparatus which has a radiation thermometer S, 4 calendar rollers C1 to C4, 3 take-off rollers T, 4 guide rollers G, and a pair of emboss rollers E as main constituent elements is started and the calendar rollers C1 to C4, the take-off rollers T, and the guide rollers G are rotated at a predetermined speed.

The rotation speed of the calendar rollers C1 to C4 is, for example, 10 to 20 m/min. The rotation speed of the take-off rollers T and the guide rollers G is, for example, 15 to 50 m/min. The rotation speed of the pair of emboss rollers E is, for example, 15 to 50 m/min.

Next, a resin composition which is set to a dissolved state by the method which will be described below is transported by a conveyer H and inserted between a first roller and a second roller from the above.

At this time, a temperature Rt at a position P in the dissolved resin composition on the conveyer H is measured by the radiation thermometer S by a temperature control mechanism, a surface temperature of the first and second rollers C1 and C2 is controlled to be equal to or less than Rt, a surface temperature of the third roller C3 is controlled to be lower than the surface temperature of both the first and second rollers C1 and C2, and a surface temperature of the fourth roller C4 is controlled to be equal to or less than the surface temperature of the third roller C3.

For example, the surface temperature of the first and second rollers C1 and C2 is controlled to be Rt±2° C., the surface temperature of the third roller C3 is controlled to be (Rt−6° C.)±2° C., and the surface temperature of the fourth roller C4 is controlled to be (Rt−12° C.)±2° C. Rt is, for example, 165° C. to 175° C.

Among the calendar rollers C1 to C4 in this state, the resin composition is molded while forming a bank between the first roller C1 and the second roller C2 at first. Next, the resin composition is guided up to between the second roller C2 and the third roller C3 by the surface of the second roller C2 and molded again at that point. Furthermore, the resin composition is guided to between the third roller C3 and the fourth roller C4 by the surface of the third roller C3 and further molded at that point. A sheet of the molded resin composition is guided and moved to the surface of the fourth roller C4.

When the sheet is firstly sent out from the fourth roller C4, the take-off rollers T, the guide rollers G, and the emboss rollers E are moved in a vertical direction in advance and made to be in a state where the gaps between the rolls are large. Then, for example, the front end of the sheet which is sent out from the fourth roller C4 passes through the take-off rollers T, the guide rollers G, and the emboss rollers E matching the speed which is sent out from the fourth roller C4 by being manually tied with a string and pulling the string. After that, the take-off rollers T, the guide rollers G, and the emboss rollers E are moved in the vertical direction and returned to the position in FIG. 1 described above. Then, the sheet automatically moves between the rolls due to the take-off rollers T, the guide rollers G, and the emboss rollers E.

Detailed description of the automatic movement of the sheet is as follows. Here, the order of the take-off rollers T and the guide rollers G is counted from the upstream side of the sheet feeding.

The sheet which is guided by the surface of the fourth roller C4 and fed out from the fourth roller C4 moves by being guided by the surface on the upper side of the first take-off roller T and, after that, moves by being guided by the surface on the lower side of the second take-off roller T and the surface on the upper side of the third take-off roller T.

Next, the sheet moves by being guided by the surface on the upper side of the first guide roller G and, after that, moves by being guided by the surface on the lower side of the second guide roller G, the surface on the upper side of the third guide roller G, and the surface on the lower side of the fourth guide roller G.

Then, the sheet is guided by the pair of emboss rollers E and moves to a winding roller (which is not shown in the diagram) side. The sheet is rolled between the pair of emboss rollers E and the sheet surface is made to be a mirror. Here, in the present embodiment, the resin composition sheet is stretched between the fourth roller C4 of the calendar rolls C1 to C4 and the emboss rollers E; however, the stretching of the sheet is not necessary.

Thus, the sheet is stably produced over a long period by continuously operating the calendar processing apparatus.

The method for melt-kneading a resin in the step before the calendar roller is not particularly limited. First, a blend of predetermined amounts of resin components and various types of additive agents (a heat stabilizer, a lubricant, a stabilization assisting agent, a process assisting agent, a filler, an antioxidant, a light stabilizer, a pigment, a flame retardant, an anti-static agent, a reinforcing agent, a modifier, and the like) is evenly mixed or mixed and kneaded by a general method such as hot blending or cold blending, for example, using a mixer and/or a mixing kneader or the like such as a ribbon blender, a super mixer, a tumbler mixer, a Henschel mixer, or a mixing roller. The blending order or the like at this time is not particularly limited and it is possible to arbitrarily use a technique in a range which does not adversely affect the object of the invention.

The resin composition which is blended in this manner is melt-kneaded. At this time, kneading is carried out while melting using a kneader or the like such as a co-kneader, a Banbury mixer, or an extruder. After that, the resin composition is inserted into the calendar processing apparatus after being passed through a strainer extruder for the purpose of filtering foreign matter which may be included in the composition and equalizing the temperature of the composition.

It is possible to appropriately blend a heat stabilizer, a lubricant, a stabilization assisting agent, a process assisting agent, a filler, an antioxidant, a light stabilizer, a pigment, and the like in the resin composition which has the vinyl chloride-based resin of the present embodiment as a main component as necessary in the range which does not adversely affect the object of the invention.

It is possible to use a heat stabilizer in a range which does not adversely affect the object of the invention without being particularly limited. Examples of heat stabilizers include organic tin-based heat stabilizers such as dimethyl tin mercapto, dibutyl tin mercapto, dioctyl tin mercapto, dibutyl tin marate, dioctyl tin marate, and dibutyl tin laurate; lead-based heat stabilizers such as a stearic acid lead, a dibasic lead phosphite, and a tribasic lead phosphite; a calcium-zinc-based heat stabilizer; a barium-zinc-based heat stabilizer; a calcium-barium-zinc-based heat stabilizer; a cadmium-barium-based heat stabilizer; a magnesium-aluminum-based heat stabilizer, and the like and these may be used individually or two or more types may be used together. In addition, the usage amount is also not particularly limited in the range which does not adversely affect the object of the invention; however, when used, the range is preferably 5 parts by weight or less with respect to the total amount of 100 parts by weight of the resin components.

It is possible to use a lubricant in the range which does not adversely affect the object of the invention without being particularly limited except for a paraffin wax-based lubricant which easily bleeds out (bleeding out to the sheet surface after producing the sheet, the same applies below), a metal stearate-based lubricant, and an alcohol-based lubricant. Examples of lubricants include a polyolefin wax-based lubricant, an ester-based lubricant, an oligomer-based lubricant, and the like, and these may be used individually or two or more types may be used together. In addition, the usage amount is also not particularly limited in a range which does not adversely affect the object of the invention; however, when used, the range is preferably 3 parts by weight or less with respect to the total amount 100 parts by weight of the resin components.

It is possible to use a stabilization assisting agent in a range which does not adversely affect the object of the invention without being particularly limited. Examples of stabilization assisting agents include epoxidized soybean oil, epoxidized linseed oil, epoxidized tetrahydrophthalate, epoxidized polybutadiene, phosphoric ester, and the like and these may be used individually or two or more types may be used together. In addition, the usage amount is also not particularly limited in a range which does not adversely affect the object of the invention; however, when used, the range is preferably 5 parts by weight or less with respect to the total amount 100 parts by weight of the resin components.

It is possible to use a process assisting agent in the range which does not adversely affect the object of the invention without being particularly limited. Examples of process assisting agents include acryl-based process assisting agents such as a n-butyl acrylate/methyl methacrylate copolymer, a 2-ethylhexyl acrylate/methyl methacrylate copolymer, and a 2-ethylhexyl acrylate/methyl methacrylate/n-butyl methacrylate copolymer; a polyester-based process assisting agent, and the like and these may be used individually or two or more types may be used together. In addition, the usage amount is also not particularly limited in the range which does not adversely affect the object of the invention; however, when used, the range is preferably 10 parts by weight or less with respect to the total amount 100 parts by weight of the resin components.

It is possible to use a filler in a range which does not adversely affect the object of the invention without being particularly limited. Examples of fillers include calcium carbonate, magnesium carbonate, lithium carbonate, kaolin gray, gypsum, mica, talc, magnesium hydroxide, calcium silicate, borax, and the like and these may be used individually or two or more types may be used together. In addition, the usage amount is also not particularly limited in a range which does not adversely affect the object of the invention; however, when used, the range is preferably 50 parts by weight or less with respect to the total amount 100 parts by weight of the resin components.

It is possible to use an antioxidant in the range which does not adversely affect the object of the invention without being particularly limited. Examples of antioxidants include a phenol-based antioxidant, a phosphite-based antioxidant, a thioether-based antioxidant, a magnesium-aluminum-based antioxidant, and the like and these may be used individually or two or more types may be used together. In addition, the usage amount is also not particularly limited in a range which does not adversely affect the object of the invention; however, when used, the range is preferably 5 parts by weight or less with respect to the total amount 100 parts by weight of the resin components.

It is possible to use a light stabilizer in the range which does not adversely affect the object of the invention without being particularly limited. Examples of light stabilizers include an ultraviolet absorber such as a salicylate ester-based ultraviolet absorber, a benzophenone-based ultraviolet absorber, a benzotriazole-based ultraviolet absorber, a cyanoacrylate-based ultraviolet absorber, and the like; a hindered amine-based light stabilizer, and the like and these may be used individually or two or more types may be used together. In addition, the usage amount is also not particularly limited in a range which does not adversely affect the object of the invention; however, when used, the range is preferably 5 parts by weight or less with respect to the total amount 100 parts by weight of the resin components.

It is possible to use a pigment in the range which does not adversely affect the object of the invention without being particularly limited. Examples of pigments include an azo-based pigment, an indigo-based pigment, a phthalocyanine-based pigment, a threne-based pigment, a dye lake-based pigment, an oxide-based pigment, a molybdenum chromate-based pigment, a sulfide selenide-based pigment, a ferro-cyanide-based pigment, an ultramarine blue-based pigment, and the like and these may be used individually or two or more types may be used together. In addition, the usage amount is also not particularly limited in a range which does not adversely affect the object of the invention; however, when used, the range is preferably 20 parts by weight or less with respect to the total amount 100 parts by weight of the resin components.

Other than these, it is also possible to appropriately blend a flame retardant, an anti-static agent, a reinforcing agent, a modifier, and the like in a range which does not adversely affect the object of the invention as necessary and the usage amounts thereof are also not particularly limited in a range which does not adversely affect the object of the invention.

Here, a treatment of aging by heating is preferably carried out on the vinyl chloride-based resin which is formed in a sheet form described above. Since a large force is necessary during manufacturing for the vinyl chloride-based resin which is formed in a sheet form described above and which does not include a plasticizer, there are cases where stress remains in the vinyl chloride-based resin which is formed in a sheet form and there are cases where the recording medium contracts due to the remaining stress at the time of high temperature drying after printing. Therefore, residual warping of the sheet is preferably alleviated by carrying out an aging treatment by heating the vinyl chloride-based resin sheet.

The recording medium which is formed by a sheet on which an aging treatment is carried out does not contract even when dried at a high temperature after high density printing and has high dimensional stability. The temperature at which the aging treatment is carried out is preferably 40° C. or more and 80° C. or less and more preferably 50° C. or more and 60° C. or less, the time during which the aging treatment is carried out is preferably 1 hour or more and 24 hours or less and more preferably 5 hours or more and 15 hours or less; however, the conditions are not particularly limited as long as the residual stress of the vinyl chloride-based resin which is formed in a sheet form is alleviated. For example, a heating treatment is performed in an atmosphere of 50° C. for 10 hours as the aging treatment. Here, the heating method as the aging treatment is also not particularly limited and it is possible to use a heating method known in the art.

Furthermore, in a case of using the vinyl chloride-based resin which is formed in a sheet form described above for the purpose of making a sign, for example, a recording medium may be formed by forming an adhesive layer on one surface of a vinyl chloride-based resin sheet and subsequently forming a separator layer so as to come into contact with the adhesive layer.

2. Ink Jet Recording Method

Next, description will be given of an example of the ink jet recording method according to the present embodiment.

The ink jet recording method according to the present embodiment is for carrying out recording on a recording medium which is formed of a vinyl chloride-based resin by discharging solvent-based ink from an ink jet head and the recording medium satisfies (1), (2), and (3) described below.

(1): an FT-IR peak wavenumber is less than 2924 $cm^{-1}$ (2): a contraction rate before and after leaving at 60° C. for 3 hours is less than 1.8%

(3): none of a phthalate ester-based plasticizer, a phosphate ester-based plasticizer, and a fatty acid ester-based plasticizer are included.

The ink jet recording method according to the present embodiment includes a step of recording in which recording is performed on a recording medium by discharging a solvent-based ink which includes a coloring material from an ink jet head onto the recording medium described above. In the present embodiment, due to the recording medium which is formed of a vinyl chloride-based resin satisfying (1), (2), and (3) described above, high density printing is possible and, moreover, the recording medium does not contract even when dried at a high temperature after the high density printing. For this reason, the obtained image is provided with a fastness since the recorded matter which is obtained by the recording method has high dimensional stability and recording is carried out using the solvent-based ink described above.

Here, the recording in the step of recording described above is recording an image by discharging liquid droplets of a solvent-based ink from nozzles of an ink jet head and attaching the liquid to a recording medium surface. Due to this, an image which is formed of the solvent-based ink is formed on the recording medium surface.

An "image" in the invention indicates a recording pattern which is formed from a group of dots and also includes printed text and solid images. Here, the "solid image" has the meaning of an image pattern which is to be an image where dots are recorded with respect to all the pixels of pixels which are the minimum recording unit region which is defined by the recording resolution, and the recording region of the recording medium is generally covered with ink and the base of the recording medium is not seen.

Here, in the present embodiment, the maximum attachment amount of the solvent-based ink to the recording medium surface is preferably 5 mg/inch$^2$ or more and 15 mg/inch$^2$ or less. When the maximum attachment amount of the solvent-based ink to the recording medium surface is within the range described above, it is preferable in the point that it is also possible to increase the speed of recording with the solvent-based ink.

In addition, in the present embodiment, "high density printing" refers to printing in which the ink DUTY is 90% or more. In the present embodiment, since recording is carried out with respect to a recording medium which does not include the plasticizer described above, the recording medium is a recording medium with quick drying property which is excellent in solvent volatility without the solvent of the solvent-based ink being accumulated in the recording medium, and aggregation of ink or the like in high density printing is suppressed.

It is possible to evaluate the aggregation of the ink in the high density printing using the DUTY limit value. The "DUTY limit value" has the meaning of the maximum DUTY value at which image quality defects such as aggregation of ink are not generated, that is, the ratio of "the number of dots (maximum DUTY) which are able to be formed according to the absorption capacity of the recording medium for each unit region of the recording medium" with respect to "the number of dots (ink amount) which can be formed by a recording apparatus for each unit region of a recording medium". In the present embodiment, by using the recording medium described above, the DUTY limit value is 90% or more and high density printing is possible.

A step of drying in which the solvent-based ink which is attached to the recording medium is dried is provided after the step of recording described above. In the step of drying, the drying is preferably performed until stickiness is not felt when touching the solvent-based ink which is attached to the recording medium surface. The step of drying may be performed by natural drying; however, drying by heating is preferable. The heating method is not particularly limited; however, in this case, the temperature of the recording medium is preferably 50° C. or more and 70° C. or less, and more preferably 50° C. or more and 60° C. or less. By heating the recording medium to the temperature described above, it is possible to make the recording speed fast.

In the present embodiment, since the recording medium to be used satisfies (1): an FT-IR peak wavenumber is less than 2924 $cm^{-1}$ and (2): a contraction rate before and after leaving at 60° C. for 3 hours is less than 1.8%, even when performing forced drying at a high temperature in the step of drying described above, the recording medium does not contract and is excellent in dimensional stability.

EXAMPLES

3. Examples

More detailed description will be given below of the invention according to Examples and Comparative Examples; however, the invention is not only limited to the Examples. Here, unless otherwise stated, "parts" and "%" in Examples and Comparative Examples are based on mass.

Example 1

Preparation of Substrate of Recording Medium

A vinyl chloride resin-based substrate with a thickness of 80 μm which did not include a plasticizer as a substrate was prepared and then residual warping of the substrate was alleviated by performing aging treatment by leaving the substrate in an atmosphere of 50° C. for 10 hours to form a vinyl chloride resin-based substrate A. For the aged substrate surface, the wavenumber ($cm^{-1}$) of the absorption peak was measured based on the stretching vibration of CH using the method described below.

Measurement of FT-IR Peak of Substrate Surface

Figure 2:
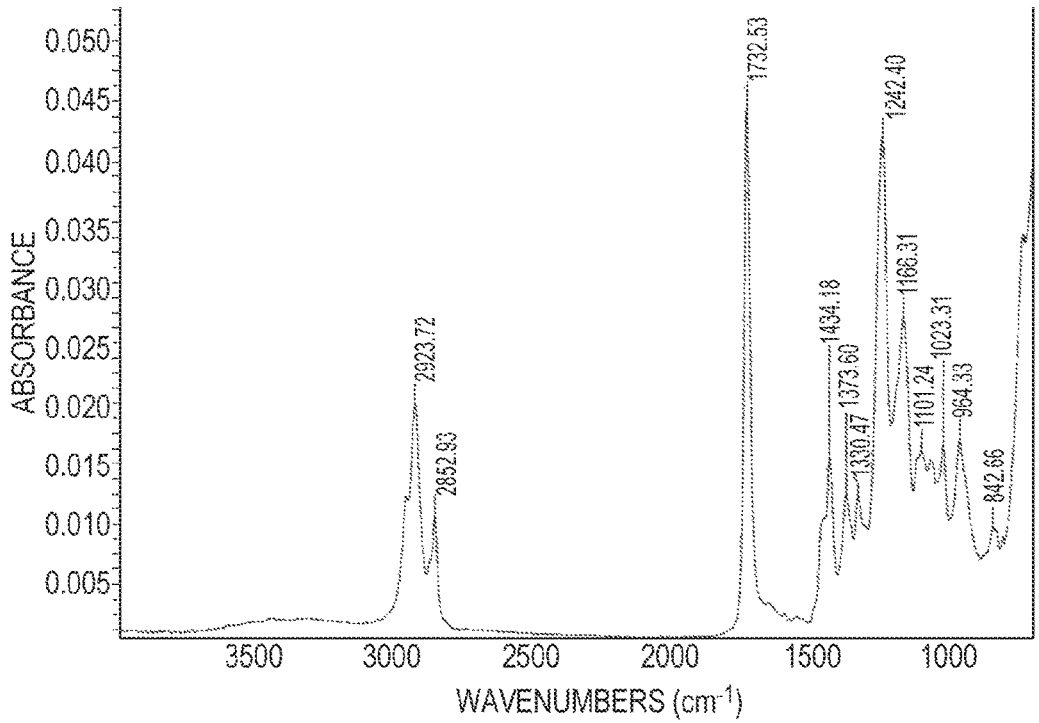
FIG. 2 is an FT-IR spectrum of a vinyl chloride resin-based substrate A which is used in Example 1.

The FT-IR peak of the vinyl chloride resin-based substrate surface was measured using an ATR method in a range of an incident angle of 45°, an automatic cumulative number (cumulative number is 32), and a measuring region of 400 to 4000 $cm^{-1}$ using a germanium prism (manufactured by Nicolet Corp.) after setting a total reflection measuring apparatus (ATR) in a Fourier transform infrared spectrophotometer (FT-IR-6700 manufactured by Thunderdome Corp.), and the wavenumber ($cm^{-1}$) of the peak was examined based on the stretching vibration of CH seen in the vicinity of 3000 to 2800 $cm^{-1}$ of the obtained ATR spectrum. The wavenumber ($cm^{-1}$) of the peak based on the stretching vibration of CH on the surface of the vinyl chloride resin-based substrate A was 2923.7 $cm^{-1}$. The obtained spectrum is shown in FIG. 2.

Production of Recording Medium

Next, an adhesive layer was formed by applying an adhesive layer forming composition with the composition described below on one surface of the substrate A described above such that the dry film thickness was 20 μm, subsequently, a separator layer was formed by applying a separator layer forming composition with the composition described below on the adhesive layer such that the dry thickness was 0.1 μm, and the recording medium in Example 1 was obtained.

Composition of adhesive layer forming composition: a reforming type adhesive agent in which acryl resin emulsion is copolymerized with a vinyl acetate resin.

Composition of separator layer forming composition: a separator in which polyethylene is applied on both surfaces of a substrate which has a pulp as the main component.

Measurement of Contraction Rate of Substrate

The obtained recording medium was cut at 10 mm in a width direction and 30 mm in a length direction (a direction which is orthogonal to the width direction), the lengths in the width direction and the length direction were measured before being left, then the lengths in the width direction and the length direction were measured after leaving the substrate at an atmosphere of 60° C. for 3 hours, and the contraction rate was obtained by the following formula from the dimensional change in the width direction and the length direction before and after leaving.

Contraction rate (%)={(length before leaving)−(length after leaving)}/(length before leaving)×100

Measurement of DUTY Limit Value

Drying was carried out at 50° C. after printing on the vinyl chloride substrate surface (the surface on the side on which the adhesive layer is not formed) of the obtained recording medium at a resolution of 720×1440 dpi and scanning with 6 passes using an ink jet printer (SC-50650, manufactured by Seiko Epson Corp.) on which the solvent ink with the composition described below is mounted and the maximum DUTY value at which image quality defects such as aggregation of ink were not generated was obtained as the DUTY limit value (%).

The solvent ink has the composition described below and was prepared as described below.

Composition of Solvent Ink

Diethylene glycol diethyl ether 65 to 70 parts by weight
Diethylene glycol methylethyl ether 20 parts by weight
γ-butyrolactone 10 to 15 parts by weight 3.5 parts by weight of carbon black (produced by Mitsubishi Chemical Corp. "MA-8") and 2.0 parts by weight of a dispersing agent (a polyester-based polymer compound, produced by Takefu Fine Chemicals Co., Ltd. "HINOACT KF1-M") were added to a part of the solvent with the composition described above, stirring was carried out at 3000 rpm for 1 hour in a dissolver, and then preliminary dispersion was carried out in a bead mill filled with zirconia beads (2 mm), and pigment particles with an average particle diameter of 5 μm or less were obtained.

Furthermore, the main dispersion was performed in a nano mill filled with zirconia beads (0.3 mm) and a pigment dispersing liquid in which the average particle diameter of the pigment particles was 60 nm was obtained. While stirring the obtained pigment dispersing liquid at 4000 rpm, 3.0 parts by weight of a binder resin (produced by Rohm & Haas Co., Ltd. "Paraloid B-99N", molecular weight of 15000, Tg=82° C., a copolymer resin of methyl methacrylate and butyl methacrylate) and the remainder of the mixed solvent which was produced as described above were added and the solvent ink was prepared.

Example 2

A vinyl chloride resin-based substrate B which does not include a plasticizer was obtained by being prepared in the same manner as the vinyl chloride resin-based substrate A in Example 1. The wavenumber ($cm^1$) of the peak based on the stretching vibration of CH on the surface of the vinyl chloride resin-based substrate B was 2923.9 $cm^{-1}$. The recording medium was produced in the same manner as Example 1 and the contraction rate and the DUTY limit value were measured in the same manner.

Comparative Example 1

Figure 3:
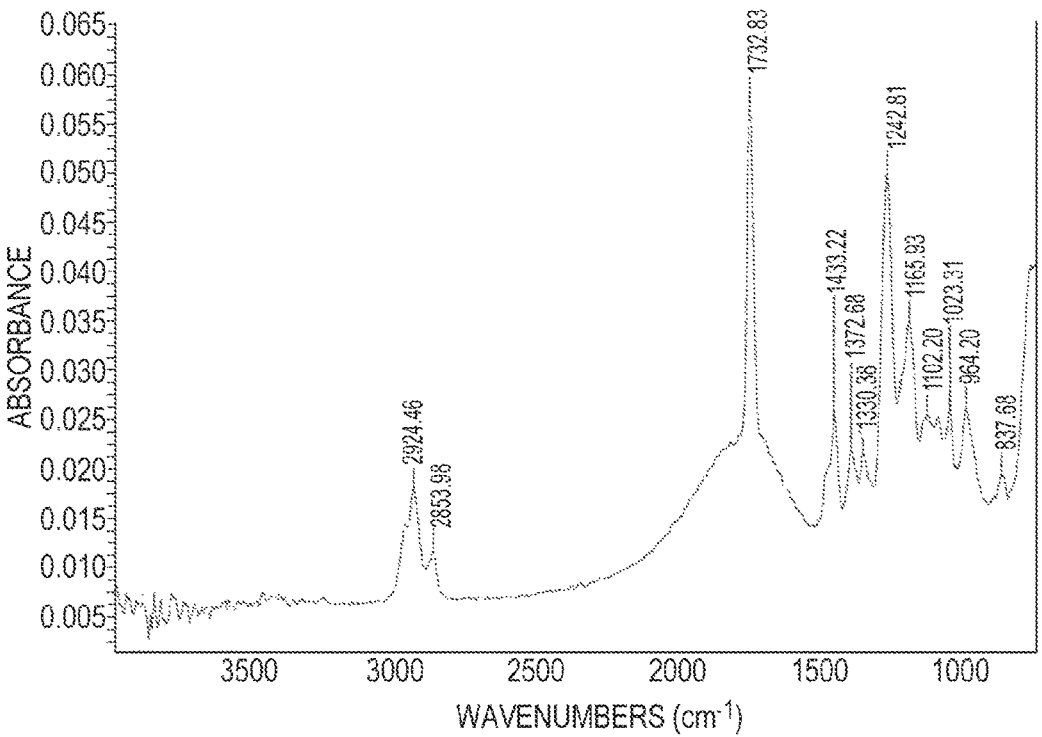
FIG. 3 is an FT-IR spectrum of a vinyl chloride resin-based substrate C which is used in Comparative Example 1.

The vinyl chloride resin-based substrate A in Example 1 was changed to a vinyl chloride resin-based substrate C in which the wavenumber ($cm^{-1}$) of the peak based on the stretching vibration of CH on the substrate surface was 2924.5 $cm^{-1}$ and, other than this, was produced in the same manner as Example 1 and the contraction rate and the DUTY limit value were measured in the same manner. The FT-IR spectrum of the vinyl chloride resin-based substrate C is shown in FIG. 3.

Comparative Example 2

The vinyl chloride resin-based substrate A in Example 1 was changed to a vinyl chloride resin-based substrate D in which the wavenumber ($cm^{-1}$) of the peak based on stretching vibration of CH on the substrate surface is 2924.6 $cm^{-1}$ and, other than this, was produced in the same manner as Example 1 and the contraction rate and the DUTY limit value were measured in the same manner.

Comparative Example 3

The vinyl chloride resin-based substrate A in Example 1 was changed to a vinyl chloride resin-based substrate E in which the wavenumber ($cm^{-1}$) of the peak based on the stretching vibration of CH on the substrate surface is 2925.2 $cm^{-1}$ and, other than this, was produced in the same manner as Example 1 and the contraction rate and the DUTY limit value were measured in the same manner.

Comparative Example 4

The vinyl chloride resin-based substrate A in Example 1 was changed to a vinyl chloride resin-based substrate F in which the wavenumber ($cm^{-1}$) of the peak based on stretching vibration of CH on the substrate surface is 2926.2 $cm^{-1}$ and, other than this, was produced in the same manner as Example 1 and the contraction rate and the DUTY limit value were measured in the same manner.

Comparative Example 5

The vinyl chloride resin-based substrate A in Example 1 was changed to a vinyl chloride resin-based substrate G in which the wavenumber ($cm^{-1}$) of the peak based on stretching vibration of CH on the substrate surface is 2926.3 $cm^{-1}$ and, other than this, was produced in the same manner as Example 1 and the contraction rate and the DUTY limit value were measured in the same manner.

The FT-IR peak wavenumbers ($cm^{-1}$), the contraction rates (%), and the DUTY limit values (%) of the substrates in Examples 1 and 2 and Comparative Examples 1 to 5 are shown in the Table below.

TABLE

| | Substrate | FT-IR peak wavenumber (cm$^{-1}$) | Contraction rate of substrate (%) | DUTY limit value (%) |
|---|---|---|---|---|
| Example 1 | Vinyl chloride resin-based substrate A | 2923.7 | 1.4 | 90 |
| Example 2 | Vinyl chloride resin-based substrate B | 2923.9 | 1.6 | 90 |
| Comparative Example 1 | Vinyl chloride resin-based substrate C | 2924.5 | 1.8 | 90 |
| Comparative Example 2 | Vinyl chloride resin-based substrate D | 2924.6 | 1.8 | 65 |
| Comparative Example 3 | Vinyl chloride resin-based substrate E | 2925.2 | 1.9 | 55 |
| Comparative Example 4 | Vinyl chloride resin-based substrate F | 2926.2 | 2.1 | 65 |
| Comparative Example 5 | Vinyl chloride resin-based substrate G | 2926.3 | 2.2 | 55 |

In Examples 1 and 2, since the obtained recorded matter did not include a plasticizer, image quality defects such as aggregation of ink were not easily generated and the DUTY limit value was as high as 90%. In contrast, in Comparative Examples 2 to 5, aggregation of ink or the like was frequently generated, the image quality was decreased, and the DUTY limit value was low. In addition, the contraction rate of the substrate was low in Examples 1 and 2 since the vinyl chloride resin-based substrate in which remaining stress was alleviated by an aging treatment was used, while the contraction rate of the substrate in Comparative Examples 1 to 5 was higher than in Examples and the result was poor dimensional stability. Thus, it is understood that, in a case where the vinyl chloride resin-based substrate which is a printing surface of the recording medium does not satisfy the three conditions which are (1): an FT-IR peak wavenumber is less than 2924 cm$^{-1}$, (2): a contraction rate before and after leaving at 60° C. for 3 hours is less than 1.8%, and (3): none of a phthalate ester-based plasticizer, a phosphate ester-based plasticizer, and a fatty acid ester-based plasticizer are included, the recording medium contracts and the image quality is also decreased.

The invention is not limited to the embodiments described above and various types of modifications are possible. For example, the invention includes configurations which are substantially the same (for example, configurations in which the functions, methods, and results are the same or configurations in which the purposes and effects are the same) as the configurations described in the embodiments. In addition, the invention includes configurations in which portions which are not essential in the configurations described in the embodiments are replaced. In addition, the invention includes configurations which exhibit the same operational effects as the configurations described in the embodiments or configurations which are able to achieve the same purpose. In addition, the invention includes configurations in which techniques known in the art are added to the configurations described in the embodiments.

This application claims priority to Japanese Patent Application No. 2015-221953 filed on Nov. 12, 2015. The entire disclosure of Japanese Patent Application No. 2015-221953 is hereby incorporated herein by reference.

What is claimed is:

1. An ink jet recording method for carrying out recording on a recording medium which is formed of a vinyl chloride-based resin by discharging a solvent-based ink from an ink jet head, wherein the recording medium satisfies (1), (2), and (3) described below, (1): an FT-IR peak wavenumber is less than 2924 cm$^{-1}$ (2): a contraction rate before and after leaving at 60° C. for 3 hours is less than 1.8%

(3): none of a phthalate ester-based plasticizer, a phosphate ester-based plasticizer, and a fatty acid ester-based plasticizer are included.

2. The ink jet recording method according to claim 1, wherein the solvent-based ink includes at least one selected from a polyoxyethylene glycol-based solvent which is represented by General Formula (1) described below and a lactone-based solvent,

$$R^{11}-(OC_2H_4)_n-OR^{12} \quad (1)$$

(in General Formula (1), $R^{11}$ and $R^{12}$ are alkyl groups having 1 to 3 carbon atoms and may be the same or different, and n is an integer of 2 to 4).

3. The ink jet recording method according to claim 2, wherein the lactone-based solvent is γ-butyrolactone or γ-valerolactone.

4. The ink jet recording method according to claim 2, wherein $R^{11}$ and $R^{12}$ in General Formula (1) are straight-chain or branched alkyl groups and a boiling point is 150° C. or more under atmospheric pressure.

5. The ink jet recording method according to claim 1, wherein the solvent-based ink further contains a binder resin.

6. The ink jet recording method according to claim 5, wherein the binder resin is a (meth)acryl resin.

7. An ink jet recording apparatus which carries out recording using the ink jet recording method according to claim 1.

8. An ink jet recording apparatus which carries out recording using the ink jet recording method according to claim 2.

9. An ink jet recording apparatus which carries out recording using the ink jet recording method according to claim 3.

10. An ink jet recording apparatus which carries out recording using the ink jet recording method according to claim 4.

11. An ink jet recording apparatus which carries out recording using the ink jet recording method according to claim 5.

12. An ink jet recording apparatus which carries out recording using the ink jet recording method according to claim 6.

13. A method for manufacturing a recording medium which is used for the ink jet recording method according to claim 1,
wherein the vinyl chloride-based resin is obtained by copolymerizing (A) vinyl chloride-based monomer and (B) macromonomer which has a polymer formed of acrylic acid-n-butyl in a main chain by a suspension polymerization method in a range of (A)/(B)=85 mass %/15 mass % to 75 mass %/25 mass %.

14. A method for manufacturing a recording medium which is used for the ink jet recording method according to claim 2,
wherein the vinyl chloride-based resin is obtained by copolymerizing (A) vinyl chloride-based monomer and (B) macromonomer which has a polymer formed of acrylic acid-n-butyl in a main chain by a suspension polymerization method in a range of (A)/(B)=85 mass %/15 mass % to 75 mass %/25 mass %.

15. A method for manufacturing a recording medium which is used for the ink jet recording method according to claim 3,
wherein the vinyl chloride-based resin is obtained by copolymerizing (A) vinyl chloride-based monomer and (B) macromonomer which has a polymer formed of acrylic acid-n-butyl in a main chain by a suspension polymerization method in a range of (A)/(B)=85 mass %/15 mass % to 75 mass %/25 mass %.

16. A method for manufacturing a recording medium which is used for the ink jet recording method according to claim 4,
wherein the vinyl chloride-based resin is obtained by copolymerizing (A) vinyl chloride-based monomer and (B) macromonomer which has a polymer formed of acrylic acid-n-butyl in a main chain by a suspension polymerization method in a range of (A)/(B)=85 mass %/15 mass % to 75 mass %/25 mass %.

17. A method for manufacturing a recording medium which is used for the ink jet recording method according to claim 5,
wherein the vinyl chloride-based resin is obtained by copolymerizing (A) vinyl chloride-based monomer and (B) macromonomer which has a polymer formed of acrylic acid-n-butyl in a main chain by a suspension polymerization method in a range of (A)/(B)=85 mass %/15 mass % to 75 mass %/25 mass %.

18. A method for manufacturing a recording medium which is used for the ink jet recording method according to claim 6,
wherein the vinyl chloride-based resin is obtained by copolymerizing (A) vinyl chloride-based monomer and (B) macromonomer which has a polymer formed of acrylic acid-n-butyl in a main chain by a suspension polymerization method in a range of (A)/(B)=85 mass %/15 mass % to 75 mass %/25 mass %.

19. The method for manufacturing a recording medium according to claim 13,
wherein an aging treatment is performed by heating on the vinyl chloride-based resin.

* * * * *